Aug. 11, 1953 A. J. QUINN 2,648,207
UNIVERSAL JOINT
Filed Dec. 24, 1947
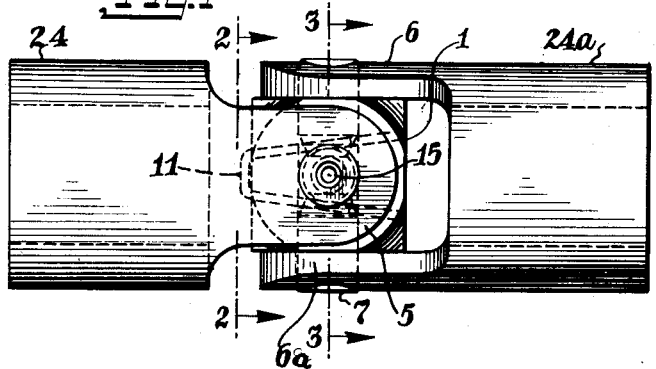
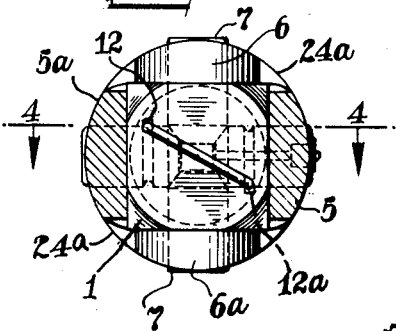
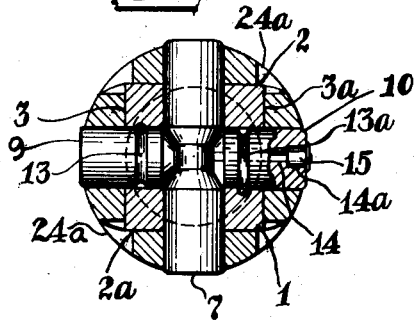
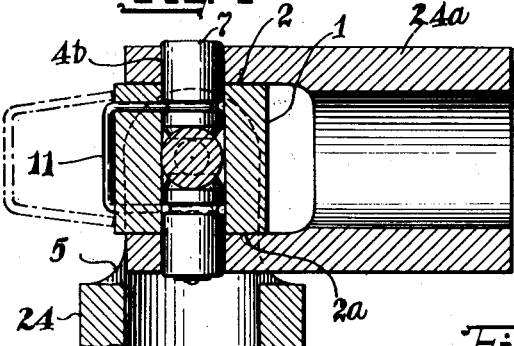
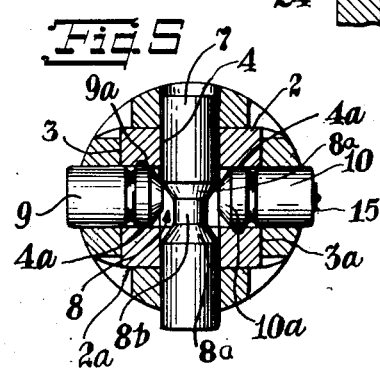
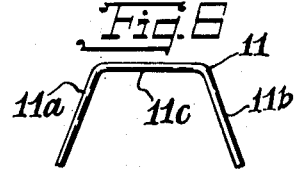
INVENTOR
ALOYSIUS J. QUINN
BY *Joseph J. Quinn*
ATTORNEY Patented Aug. 11, 1953

2,648,207

UNITED STATES PATENT OFFICE 2,648,207

UNIVERSAL JOINT

Aloysius J. Quinn, North Bergen, N. J., assignor to Brooks Equipment Corporation, a corporation of New York Application December 24, 1947, Serial No. 793,608

2 Claims. (Cl. 64—17)

This invention relates to improvements in universal joints.

Universal joints have heretofore either employed continuous unsymmetrical block-pivoting pins, one of which extends through a transverse bore in the other, or halves of one symmetrical pin are connected together by an axial tie member of smaller diameter extending through a transverse bore in the other pin, and in all such cases, there is an inherent weakness in the small pin and unequal stress is, in operation, of the joint, placed upon portions of said small pin.

One of the objects of this invention is to provide greater strength in the joint construction by the use of a through pivot pin extending completely across the joint diametrically and having at its middle portion a circumferential groove cooperating with two stub or semi-through pivot pins, all three pins being of a similar diameter and interengageable to eliminate the weakness inherent in the use of a two pin construction in which the larger diameter pin is transversely-bored and either has a small diameter pin or a tie pin passing through the same.

Another object is to produce a joint construction that will provide a symmetrical design of pivot pins, pivot pin holes and blocks to cause equal distribution of wear on the hardened and ground working parts.

Still another object of my invention is to provide a joint construction in which the pins during operation are firmly locked by a simple locking element against axial movement or other possible displacement from the block, but may, by an easy manipulation of the locking element, be released from such axial-locking engagement with the block and may then be readily and easily removed from the block to disassemble the joint.

Still another object of my invention is to provide a joint construction which is capable of ready and easy lubrication.

Still another object of my invention is to provide a joint construction in which a connection between the pins is formed at or closely adjacent to the axis of the block where theoretically no stress is encountered during operative movement of the joint.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in elevation of a universal joint embodying my invention;

Fig. 2 is a cross-section on the line 2—2 of Fig. 1 looking in the direction of the arrows;

Fig. 3 is a cross-section on the line 3—3 of Fig. 1 looking in the direction of the arrows, and showing the coupling portions of the assembling element in engaged and locked position;

Fig. 4 is a view partly in elevation and partly in longitudinal section showing in full lines the position in assembled and locked condition of the assembling or locking element and in dotted lines showing the position thereof in unlocked condition to enable disassembly; and Fig. 5 is a cross-section similar to Fig. 3 on the line 4—4 of Fig. 2 and showing the coupling pins withdrawn from the stub pivot pins and the pivot pins partly withdrawn from the joint, and Fig. 6 is a view in side elevation showing the coupling pins removed from the universal joint.

Referring now to these drawings, which illustrate a preferred embodiment of my invention, I indicates a center block member having, as shown, two pairs of opposed parallel flat faces 2—2ª and 3—3ª. The block member I is provided with intersecting bores 4—4ª of substantially similar diameter, one bore passing through and being disposed perpendicularly to the faces 2—2ª while the other bore passes through and is disposed perpendicularly of the faces 3—3ª. 24 and 24ª indicate joint members, each having forked end-portions provided with pairs of lugs 5—5ª and 6—6ª extending into contact with the pairs of opposed and parallel flat faces and having bores registering with the block bores 4—4ª.

In accordance with my invention, I am enabled to use pivot pins in both block bores of similar large diameter and thus to provide greater strength in the joint construction and a more equal distribution of wear on the hardened and ground parts thereof than when the pins in one bore are smaller than the other. I also provide means by which the pins, during operation, will be firmly locked against axial displacement but may be readily and easily assembled and disassembled by a simple manipulation. In the embodiment illustrated, I provide a through pivot pin 7 which is passed through one member 6 of the pair 6, 6ª of spaced lugs of the joint member 24, thence through the bore 4 in the center block I and thence through the opposite member 6ª of the pair of spaced lugs. This through pivot 7 is coupled to and locked in place in the center block by the provision in the surface thereof of an end-engaging seat 8 and the reception therein of the end portions 9ª—10ª of a pair of stub pivot pins 9—10 disposed in opposite portions of the block bore 4ª. These stub pivot-pins 9 and 10 are then conjointly retained against axial movement by a coupling thereof to the center block I. This is accomplished by a conjoint locking or coupling element having coupling members 11ª—11ᵇ passing through bores 12, 12ª in the body of the block to engage grooves 13, 13ª in said stub pivot pins which register with said bores 12, 12ª.

The end-engaging seat 8 comprises a circumferential groove in the through pivot pin and has inclined or tapering walls 8ª—8ª extending from the outer cylindrical surface to an axial portion 8ᵇ of smaller diameter than said through pin, and the stub pivot pins 9 and 10 comprise members, each having a diameter at the working and wearing part that is similar to the diameter of the through pin at such parts and the end portions 9ᵃ—10ᵃ are frustro-conic in conformation so as to project into the seat or groove 8 and provide complemental tapering portions which contact with the inclined or tapering walls 8ᵃ of the said seat or groove 8 and thus to produce a freely-movable coupling contact and engagement between the stub pivot pins 9 and 10 and said through pivot pin 7, while at the same time permitting free rotation of the through and stub pivot pins in their respective bores.

My preferred form of coupling or axial-locking for the stub pivot-pins preferably comprises the provision of peripheral grooves 13—13ᵃ in the stub members 9 and 10, as aforesaid, and the employment of a U-shaped conjoint coupling clip 11 preferably comprising a body or connecting part 11ᶜ and a pair of coupling legs 11ᵃ—11ᵇ passing through bores 12—12ᵃ in the block and engaging the grooves 13—13ᵃ to simultaneously couple and lock both the stub pivot pins against axial movement. The coupling legs 11—11ᵃ are thus connected together and formed integrally with a common manually manipulatable body part 11ᶜ which extends over and contacts with a neutral or otherwise unbored face of the block 1. The said coupling clip is preferably formed of spring wire and the legs 11ᵃ—11ᵇ extend outwardly at an angle to the body portion 11ᵃ so that when the legs of the clip are contracted and moved to a straightened position, and are then inserted in the bores 12—12ᵃ the clip will be automatically self-retaining in the bores because of the tendency of the legs to expand and the consequent frictional engagement thereof with the walls of the bores 12, 12ᵃ.

Facile lubrication is afforded because it is only necessary to provide an axial lubricating bore 14 in one of the stub pivots and to insert in a counter-bore 14ᵃ therein a lubricating cup 15.

Having described my invention, I claim:

1. In a universal joint construction, the combination of a center-block member having opposed parallel surfaces provided with bores intersecting each other and being substantially perpendicular to said parallel surfaces, forked members having two pairs of lugs, each pair being disposed at opposed parallel surfaces of said block, a through pivot-pin member of given diameter having rotational bearing connections with one pair of said lugs, passing through one of said intersecting bores and having at its middle portion an end-engaging depressed seat having outwardly tapering walls between the depressed seat portion and the outer peripheral surface of said through pivot-pin, a complemental pair of stub pivot pin members provided with rotational bearing connections with the other pair of lugs, having diameters substantially similar to the diameter of said through pivot-pin and passing through the other intersecting bore, said stub pivot-pin members having end portions projecting into said seat and provided with complemental tapering portions to provide interengaging rotational connections with the walls of said through pivot-pin, each of said stub pivot-pins also having a continuous circumferential groove, said block having a pair of coupling-pin bores, each extending in a direction of a chord to and registering with one of said circumferential grooves, and a pair of cylindrical coupling pins, each extending through one of said pair of coupling-pin bores and passing segmentally through one of said circumferential grooves to connect said stub pin with said block while permitting free rotation thereof about its axis, said coupling pins forming the legs of a U-formation and extending to one of the outer surfaces of said block and being connected together at said outer surface of the block by a portion forming the base of the U formation to provide a resilient clip having a continuous manipulating body part extending parallel with said outer surface and said pins extending before assembly in an outwardly inclined direction from said body part, whereby means is provided for rotatably coupling each of said stub members to the center block to retain the stub pins against longitudinal movement in their bores and for holding said end portions within said seat in the through pivot.

2. In a universal joint construction, the combination of a center-block member having opposed parallel surfaces provided with bores intersecting each other and being substantially perpendicular to said parallel surfaces, forked members having two pairs of lugs, each pair being disposed at opposed parallel surfaces of said block, a through pivot-pin member of given diameter having rotational bearing connections with one pair of said lugs, passing through one of said intersecting bores and having at its middle portion an end-engaging depressed seat having outwardly tapering walls between the depressed seat portion and the outer peripheral surface of said through pivot-pin, a complemental pair of stub pivot-pin members provided with rotational bearing connections with the other pair of lugs, having diameters substantially similar to the diameter of said through pivot-pin and passing through the other intersecting bore, said stub pivot-pin members having end portions projecting into said seat and provided with complemental tapering portions to provide interengaging rotational connections with the walls of said through pivot-pin, each of said stub pivot-pins also having a continuous circumferential groove, said block having a pair of coupling-pin bores, each extending in a direction of a chord to and registering with one of said circumferential grooves, and a pair of cylindrical coupling pins, each extending through one of said pair of coupling-pin bores and passing segmentally through one of said circumferential grooves to connect said stub-pin with said block while permitting free rotation thereof about its axis, said coupling pins extending to one of the outer surfaces of said block and being connected together at said outer surface of the block to provide a conjoint coupling clip of resilient material having a continuous manipulating body part extending parallel with said outer surface and the pins extending before assembly in an outwardly-inclined direction therefrom to permit resilient contraction toward each other for insertion into the bores in said block and to provide an automatic resilient self-retaining engagement with the walls of said coupling-pin bores.

ALOYSIUS J. QUINN.

References Cited in the file of this patent

UNITED STATES PATENTS

| Number | Name | Date |
|---|---|---|
| 1,286,267 | Fetcher | Dec. 3, 1918 |
| 1,346,776 | Washburn | July 13, 1920 |
| 2,153,415 | Fett et al. | Apr. 4, 1939 |